(12) United States Patent
Kitajima et al.

(10) Patent No.: US 7,375,322 B2
(45) Date of Patent: May 20, 2008

(54) CANTILEVER HOLDER AND SCANNING PROBE MICROSCOPE

(75) Inventors: Itaru Kitajima, Chiba (JP); Masatsugu Shigeno, Chiba (JP)

(73) Assignee: SII NanoTechnology Inc. (JP)

( * ) Notice: Subject to any disclaimer, the term of this patent is extended or adjusted under 35 U.S.C. 154(b) by 247 days.

(21) Appl. No.: 11/374,841

(22) Filed: Mar. 14, 2006

(65) Prior Publication Data

US 2006/0219916 A1      Oct. 5, 2006

(30) Foreign Application Priority Data

Mar. 15, 2005  (JP) .............................. 2005-072262
Jan. 20, 2006  (JP) .............................. 2006-012859

(51) Int. Cl.
*G01N 13/16* (2006.01)
*G01B 5/28* (2006.01)

(52) U.S. Cl. ..................... 250/306; 250/309; 73/105
(58) Field of Classification Search ..................... None
See application file for complete search history.

(56) References Cited

U.S. PATENT DOCUMENTS 6,941,798 B2 * 9/2005 Yamaoka et al. .............. 73/105
7,026,607 B2 * 4/2006 Kitajima et al. ............ 250/234
7,170,054 B2 * 1/2007 Iyoki et al. ................. 250/306

\* cited by examiner

*Primary Examiner*—Nikita Wells
(74) *Attorney, Agent, or Firm*—Adams & Wilks (57) ABSTRACT

To prevent an influence from effecting on an oscillating state of a cantilever by firmly fixing a main body portion, there is provided a cantilever holder for attachably and detachably fixing a cantilever which is provided with a stylus at a front end thereof and a base end side of which is supported by a main body portion in a single-supported state, the cantilever holder including a base member having a mounting portion for mounting the main body portion in a state of being positioned at a predetermined position, a holding member made to be able to be brought into contact with at least a surface of the main body portion in a state of mounting the main body portion on the mounting portion and extended in a direction substantially orthogonal to a longitudinal direction (axis line A direction) of the cantilever, and pressing means for pressing both ends of the holding member to the base member by a predetermined pressure, fixing the main body portion to the mounting portion by way of the holding member and capable of separating the holding member from the surface of the main body portion by releasing depression, in which the holding member is formed by a resin species material.

10 Claims, 5 Drawing Sheets

CANTILEVER HOLDER AND SCANNING PROBE MICROSCOPE

BACKGROUND OF THE INVENTION

1. Field of the Invention

The present invention relates to a cantilever holder for attachably and detachably fixing a cantilever having a stylus at a front end thereof and a scanning probe microscope having the cantilever holder.

2. Background Art

According to SPM (Scanning Probe Microscope) of a type of using a cantilever of AFM (Atomic Force Microscope) or the like, in order to use an optimum cantilever in accordance with a sample, the cantilever is attachably and detachably fixed to and from a cantilever holder and is made to be able to be interchanged. In order to fix the cantilever to the cantilever holder, normally, a main body portion for supporting a base end side of the cantilever in a single-held state is set to an attaching portion of the cantilever holder, and the main body portion is fixed to the attaching portion by being held by various holding members.

Although various holding members have been proposed, normally, a wire (refer to, for example, JP-A-2003-121335) or a leaf spring (refer to, for example, JP-A-2000-249714) is adopted. Further, generally, a metal material is used for the wire or the leaf spring to ensure to be fixed to the cantilever.

However, according to the above-described cantilever holder of the related arts, the following problem is posed.

That is, in SPM, in order to further diversely observe a sample, various measuring modes are prepared, and an observer observes the sample by selecting an optimum measuring mode in accordance with an object thereof.

For example, there is an AC mode AFM for oscillating a cantilever by a predetermined frequency (resonance frequency or a vicinity thereof) and carrying out scanning while controlling a distance between the stylus and the sample to be constant.

In carrying out measurement by the AC mode AFM, there is a case in which a main body portion cannot firmly be fixed by the cantilever holder of the related art, as a result, there is a case in which an influence is effected on oscillating the cantilever by a predetermined frequency.

Figure 11:
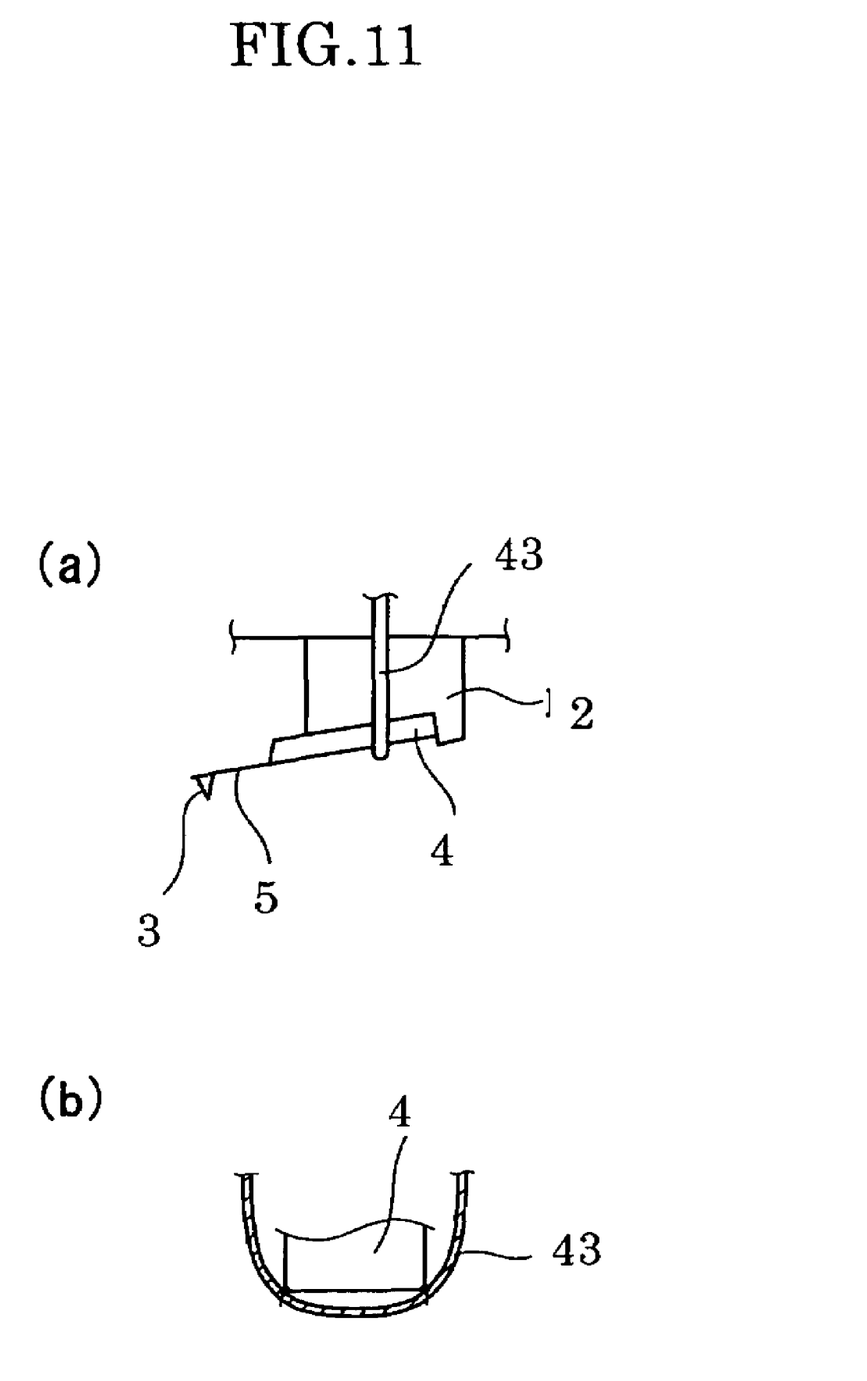
FIG. 11 illustrates views showing a state of fixing a cantilever by a wire of a cantilever holder of a related art.

That is, although according to the method of fixing the cantilever by utilizing the wire, as shown by, for example, FIGS. 11A and 11B, a main body portion 4 is pressed to a cantilever holder 2 by a wire 43, since the wire 43 is a wire member made by a metal and having a hardness, there is a case in which the wire is not deformed along an outer shape of the cantilever holder 2 to bring about a state in which the wire is brought into contact with two points of both ends of the main body portion 4. Therefore, in this case, the main body portion 4 cannot be firmly fixed by being pressed to the cantilever holder 2.

Further, although according to the method of fixing the cantilever by utilizing the leaf spring, it seems that the cantilever is fixed in a state of apparently bringing the leaf spring and the main body portion into face contact with each other, surfaces of the leaf spring and the main body portion are constituted by shapes of small recesses and projections and therefore, there is a case in which the leaf spring and the main body portion are brought into a point contact state similar to the case of the fixing method utilizing the wire. In this case, multipoints contact is produced and therefore, the fixing becomes more solid than that in the two points contact in the fixing method utilizing the wire, however, it is invariably difficult to fix firmly the main body portion.

In this way, according to the methods of the related arts, the main body portion cannot firmly be fixed and therefore, in accordance with oscillation of the cantilever, also the main body portion is oscillated. Therefore, an influence is effected on a state of oscillating the cantilever and the cantilever cannot be oscillated by a predetermined frequency.

Further, there is a case in which oscillation of the cantilever holder is transmitted to the main body portion, also in this case, the main body portion is oscillated by the transmitted oscillation and the oscillation is further transmitted to the cantilever. That is, the main body portion is not firmly fixed and therefore, oscillation of the cantilever holder is transmitted to the cantilever by way of the main body portion and the cantilever cannot be oscillated by the predetermined frequency.

Therefore, in measuring a Q curve (resonance characteristic curve for determining an optimum value (operating point) of an oscillating frequency), an influence is effected on measurement (for example, a resonance point is shifted, a magnitude of an oscillation amplitude is changed or the like) to bring about a drawback that the Q curve cannot stably be measured. As a result, measurement by the AC mode AFM cannot accurately be carried out.

SUMMARY OF THE INVENTION

The invention has been carried out in consideration of such a situation and it is an object thereof to provide a cantilever holder which does not effect an influence on an oscillating state of a cantilever by firmly fixing a main body portion and a scanning probe microscope having the cantilever holder.

In order to achieve the above-described object, the invention provides the following means.

A cantilever holder according to the invention is a cantilever holder for attachably and detachably fixing a cantilever which includes a stylus at a front end thereof and a base end side of which is supported by a main body portion in a flat plate shape in a single-supported state, the cantilever holder comprises a base member having a mounting portion for mounting the main body portion in a state of being positioned at a predetermined position, a holding member made to be able to be brought into contact with at least a surface of the main body portion in a state of mounting the main body portion on the mounting portion and extended in a direction substantially orthogonal to a longitudinal direction of the cantilever, and pressing means for pressing both ends of the holding member to the base member by a predetermined pressure, fixing the main body portion to the mounting portion by way of the holding member and capable of separating the holding member from the surface of the main body portion by releasing the both ends of the holding member from being pressed, wherein the holing member is formed by a resin species material.

According to the cantilever of the invention, by mounting the main body portion on the mounting portion of the base member, there is brought about a state in which the main body portion is positioned at the predetermined position. Successively, by the pressing means, the holding member is pressed at least to the surface of the main body portion by pressing the both ends of the holding member extended in the direction substantially orthogonal to the longitudinal direction of the cantilever to the base member by the predetermined pressure. Thereby, the main body portion can be pressed to the mounting portion to be fixed by way of the holding member. Therefore, the cantilever can be fixed by way of the main body portion.

Further, the holding member can be separated from the surface of the main body portion by releasing the holding member from being pressed and the cantilever can be detached from the mounting portion.

Particularly, the holding member is formed by the resin species material and therefore, the holding member is easy to be deformed by an elasticity of its own. Therefore, when pressed by the pressing means, the holding member is deformed in accordance with small recesses and projections of the surface of the main body portion and an outer shape of the main body portion. Therefore, different from the point contact of the related art, there is brought about a state in which there is not a clearance between the holding member and the main body portion and a contact area thereof is increased. Therefore, the main body portion can firmly be pressed to the mounting portion to be fixed.

Therefore, when the cantilever is oscillated by an AC mode AFM, the main body portion can be restrained from being oscillated by transmitting oscillation of the cantilever and therefore, an influence is not effected on an oscillating state of the cantilever, and the cantilever can firmly be oscillated by a predetermined frequency. As a result, a Q curve can accurately and stably be measured, reliability of a result of measurement by the AC mode AFM can be promoted and handling thereof is facilitated.

Particularly, since the holding member is formed by the resin species material, oscillation can be attenuated (damped) by the elasticity of it own and therefore, an influence is not effected on the oscillating state of the cantilever.

Further, according to the cantilever holder of the invention, in the cantilever holder of the invention, the holding member is a sheet in a strip-like shape.

According to the cantilever holder of the invention, the holding member is the sheet in the strip-like shape comprising the resin species material and therefore, the sheet is deformed in accordance with recesses and projections of the surface of the main body portion and the outer shape of the main body portion and presses the main body portion to the mounting portion by being brought into close contact therewith in a state of being firmly brought into face contact therewith. Therefore, the main body portion can stably be fixed to the mounting portion.

Further, according to the cantilever holder of the invention, in the cantilever holder of the invention, the holding member is a wire.

According to the cantilever holder of the invention, since the holding member is the wire comprising the resin species material, the sheet is deformed in accordance with recesses and projections of the surface of the main body portion and the outer shape of the main body portion to firmly press the main body portion to the mounting portion by being brought into close contact therewith in a state of being firmly brought into line contact therewith. Therefore, the main body portion can stably be fixed to the mounting portion.

Further, according to the cantilever holder of the invention, in the cantilever holder of the invention, the wire includes a flexible axis core comprising a metallic material at inside thereof.

According to the cantilever holder of the invention, the wire includes the flexible axis core comprising the material made of the metal and therefore, the wire becomes more solid and can transmit a pressing force from the pressing means efficiently to the main body portion. Therefore, the main body portion can further stably and firmly be fixed to the mounting portion.

Further, when both ends of the wire are fixed, the both ends can be fixed by utilizing the axis core at inside thereof such that an influence is not effected on a resin portion as less as possible. Thereby, a tension force from the both ends can be prevented from being operated to the resin portion and therefore, an elongation of the resin portion owing to the tension force is not produced. Therefore, reliability of the resin portion can be promoted and the elasticity of its own can firmly be maintained.

Further, according to the cantilever holder of the invention, in the cantilever holder of the invention, the resin species material is a conductive resin material.

According to the cantilever holder of the invention, the holding member is formed by the conductive resin material and therefore, the cantilever can be prevented from being charged, or charged static electricity can be removed. Further, thereby, an influence effected by an electric field or a magnetic field can be reduced as less as possible. Therefore, reliability of a result of measurement can further be promoted.

Further, as the conductive resin material, the resin species material per se having a conductivity may be utilized, or a material provided by mixing, for example, a carbon material of carbon nanotude or the like or a metal material with a resin species material which is not provided with a conductivity may be utilized.

Further, a cantilever holder of the invention is a cantilever holder for attachably and detachably fixing a cantilever which includes a stylus at a front end thereof and a base end side of which is supported by a main body portion in a flat plate shape in a single-supported state, the cantilever holder comprising a base member having a mounting portion for mounting the main body portion in a state of being positioned at a predetermined position, a plate-like member made to be able to be brought into contact with at least a surface of the main body portion in a state of mounting the main body portion on the mounting portion, and pressing means for fixing the main body portion to the mounting portion by pressing the plate-like member to the surface of the main body portion by a predetermined pressure and capable of separating the plate-like member from the surface of the main body portion by releasing the plate-like member from being depressed, wherein the plate-like member is formed with a resin species film at a region thereof brought into contact with the surface of the main body portion.

According to the cantilever holder of the invention, the main body portion is brought into the state of being positioned at the predetermined position by mounting the main body portion on the mounting portion of the base member. Successively, by the pressing means, the plate-like member is pressed by the predetermined pressure to be pressed at least to the surface of the main body portion. Thereby, the main body portion can be pressed to the mounting portion to be fixed by way of the plate-like member. Therefore, the cantilever can be fixed by way of the main body portion.

Further, the plate-like member can be separated from the surface of the main body portion by releasing the plate-like member from being pressed and the cantilever can be detached from the mounting portion.

Particularly, the plate-like member is formed with the resin species film at the region brought into contact with the surface of the main body portion and therefore, when pressed by the pressing means, the resin species film is deformed in accordance with small recesses and projections of the surface of the main body portion and the outer shape of the main body portion and is brought into contact therewith in the state of being brought into close contact therewith. That is, different from the point contact of the related art, there is brought about a state in which there is not a clearance between the plate-like member and the main body portion and the contact area is increased. Therefore, the main body portion can firmly be pressed to the mounting portion to be fixed.

Therefore, when the cantilever is oscillated by the AC mode AFM, the main body portion can be restrained from being oscillated by transmitting oscillation of the cantilever and therefore, an influence is not effected on the oscillating state of the cantilever and the cantilever can firmly be oscillated by a predetermined frequency. As a result, the Q curve can accurately and stably be measured, reliability of a result of measurement by the AC mode AFM can be promoted and handling thereof is also facilitated.

Further, the resin species film can attenuate (damp) oscillation by the elasticity of its own and therefore, an influence is not effected on the oscillating state of the cantilever.

Further, a cantilever holder of the invention is a cantilever holder for attachably and detachably fixing a cantilever which includes a stylus at a front end thereof and a base end side of which is supported by a main body portion in a flat plate shape in a single-supported state, the cantilever holder comprising a base member having a mounting portion for mounting the main body portion in a state of being positioned at a predetermined position, and a leaf spring capable of fixing the main body portion to the mounting portion by pressing at least a surface of the main body portion by a predetermined pressure in a state of mounting the main body portion on the mounting portion, wherein the leaf spring is formed with a resin species film at a region thereof brought into contact with the surface of the main body portion.

According to the cantilever holder of the invention, by mounting the main body portion on the mounting portion of the base member, there is brought about a state of positioning the main body portion at the predetermined position. Successively, by the leaf spring, at least the surface of the main body portion is pressed to the mounting portion by the predetermined pressure by utilizing an elastic force of its own. Thereby, the main body portion can be pressed to the mounting portion to be fixed. Therefore, the cantilever can be fixed by way of the main body portion.

Further, by releasing depression by the leaf spring by lifting the leaf spring, the cantilever can be detached from the mounting portion.

Particularly, the leaf spring is formed with the resin species film at the region brought into contact with the surface of the main body portion and therefore, when pressing the main body portion by the elasticity of its own, the resin species film is deformed in accordance with small recesses and projections of the surface of the main body portion and the outer shape of the main body portion to be brought into contact therewith in the state of being brought into close contact therewith. That is, different from the point contact of the related art, there is brought about a state in which there is not a clearance between the leaf spring and the main body portion and the contact area is increased. Therefore, the main body portion can firmly be pressed to the mounting portion to be fixed.

Therefore, when the cantilever is oscillated by the AC mode AFM, the main body portion can be restrained from being oscillated by transmitting oscillation of the cantilever and therefore, an influence is not effected on the oscillating state of the cantilever and the cantilever can firmly be oscillated by the predetermined frequency. As a result, the Q curve can accurately and stably be measured, reliability of the result of measurement by the AC mode AFM can be promoted and the handling is also facilitated.

Further, the resin species film can attenuate (damp) oscillation by the elasticity of its own and therefore, an influence is not effected on the oscillating state of the cantilever.

Further, according to the cantilever holder of the invention, in the cantilever holder of the invention, the resin species material is formed by a conductive resin material.

According to the cantilever holder of the invention, the resin species film is formed by the conductive resin material and therefore, the cantilever can be prevented from being charged, or charged static electricity can be removed. Further, thereby, an influence effected by an electric field or a magnetic field can be reduced as less as possible. Therefore, reliability of a result of measurement can further be promoted.

Further, as the conductive resin material, a conductive resin material in which the resin species material per se is provided with a conductivity may be utilized, a material provided by mixing, for example, a carbon material of carbon nanotube or the like or a metal material with a resin species material which is not provided with a conductivity may be utilized.

Further, a scanning probe microscope of the invention comprises the cantilever holder according to any of the invention, the cantilever which includes the stylus at the front end, the base end side of which is supported by the main body portion in the flat plate shape in the single-supported state and which is attachably and detachably fixed to the cantilever holder by way of the main body portion, a stage mounted with a sample and capable of arranging the sample opposedly to the stylus, moving means for moving the stylus and the sample relative to each other in a direction in parallel with a surface of the sample, and measuring means for measuring a displacement of the cantilever.

According to the scanning probe microscope of the invention, first, the cantilever in accordance with the sample is selected and is fixed to the cantilever holder by way of the main body portion. Successively, various physical property information of a surface shape, viscoelasticity or the like of the sample is started to be measured in a state of bringing the stylus at the front end of the cantilever into contact with the surface of the sample or bringing the stylus in a state of not being brought into contact therewith. For example, the surface shape of the sample is measured by carrying out scanning by moving the stylus and the sample relative to each other by the moving means in a state of oscillating the cantilever by the predetermined frequency and measuring the displacement of the cantilever, that is, the displacement of the oscillating state of the cantilever during the scanning by the measuring means.

Particularly, according to the cantilever holder, different from the cantilever by the point contact of the related art, a clearance between the holding member and the main body portion is nullified to bring the both members into close contact with each other, the main body portion is firmly pressed to the mounting portion to be fixed and therefore, the cantilever can firmly be oscillated by the predetermined frequency without effecting an influence on the oscillating state of the cantilever. Therefore, the surface of the like of the sample can accurately be measured and reliability of a result of measurement can be promoted.

According to the cantilever holder of the invention, the holding member is formed by the resin species material and therefore, the holding member is deformed in accordance with small recesses and projections of the surface of the main body portion and the outer shape of the main body portion to be brought into contact therewith in the state of being brought into close contact therewith. That is, there is brought about a state in which there is not a clearance between the holding member and the main body portion, the contact area is increased and therefore, the main body portion can firmly be pressed to the mounting portion to be fixed. Therefore, the Q curve can accurately and stably be measured by firmly oscillating the cantilever by the predetermined frequency and reliability of the result of measurement by the AC mode AFM can be promoted.

Further, according to the scanning probe microscope of the invention, the scanning probe microscope includes the cantilever holder capable of being fixed firmly without effecting an influence on the oscillating state of the cantilever and therefore, the sample can further accurately be measured and reliability of the result of measurement can be promoted.

BRIEF DESCRIPTION OF THE DRAWINGS

FIG. 11A is a side view and FIG. 11B is an enlarged sectional view showing a relationship of attaching the wire and a main body portion.

A axis line of cantilever
S sample
1 scanning probe microscope
2, 30, 40 cantilever holders
3 stylus
4 main body portion
4a surface of main body portion
5 cantilever
6 stage
7 XY scanner
8 Z scanner
9 moving means
10 measuring means
11 mounting portion
12 base member
13 sheet (holding member)
14, 32 pressing means
31 wire (holding member)
41 holding plate (plate-like member)
42 resin species film

DESCRIPTION OF THE PREFERRED EMBODIMENTS

An explanation will be given of a first embodiment of a cantilever holder and a scanning probe microscope according to the invention in reference to FIG. 1 through FIG. 4 as follows.

Figure 1:
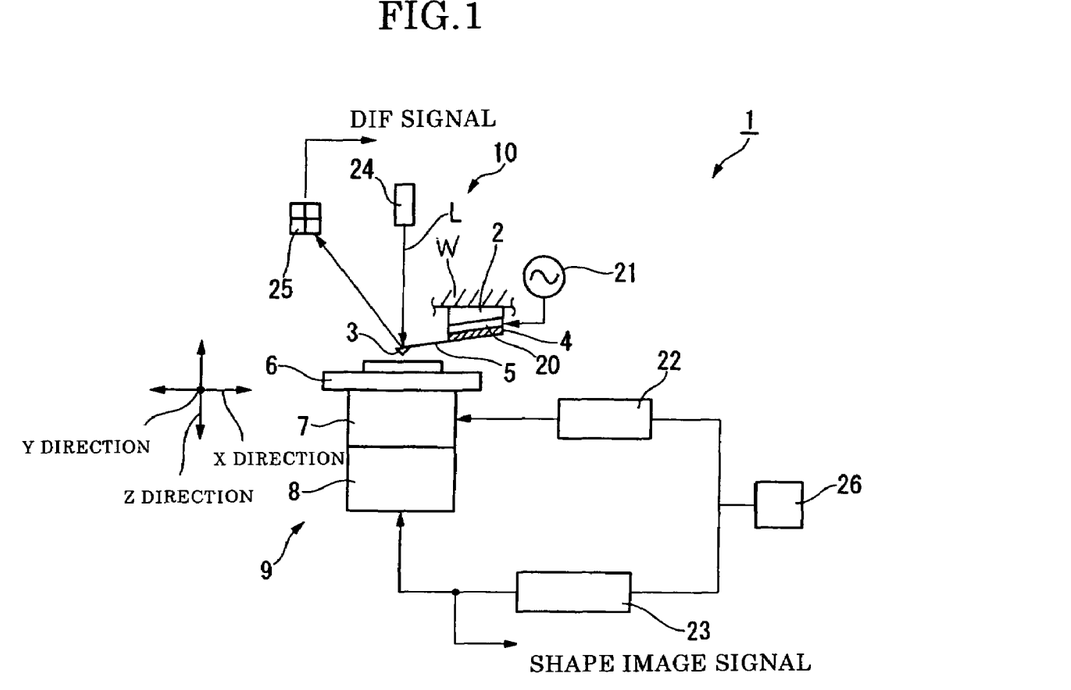
FIG. 1 is a constitution view showing a first embodiment of a scanning probe microscope according to the invention.

As shown by FIG. 1, a scanning probe microscope 1 of the embodiment includes a cantilever holder 2, a cantilever 5 which is provided with a stylus 3 at a front end thereof, a base end of which is supported in a single-held state by a main body portion 4 in a shape of a flat plate, and which is attachably and detachably fixed to the cantilever holder 2 by way of the main body portion 4, a stage 6 mounted with a sample S and capable of arranging the sample S opposedly to the stylus 3, moving means 9 comprising an XY scanner 7 and a Z scanner 8 for moving the stylus 3 and the sample S relative to each other in XY directions in parallel with a surface of the sample and moving the stylus 3 and the sample S in Z direction orthogonal to the surface of the sample relative to each other, and measuring means 10 for measuring a displacement of the cantilever 5.

Further, according to the embodiment, an explanation will be given by taking an example of a case of measuring a surface shape of the sample S by oscillating the cantilever 5 by a predetermined frequency.

Figure 2:
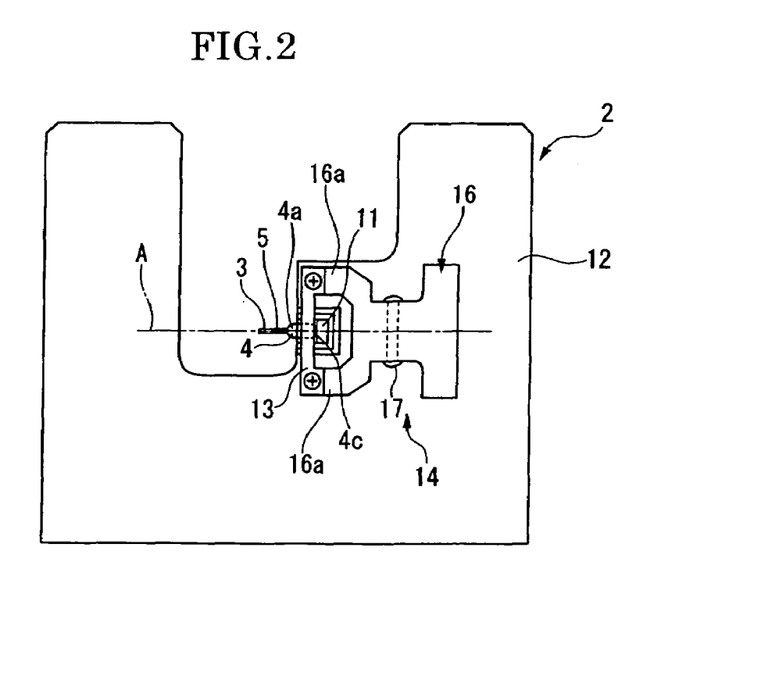
FIG. 2 is a top view of a cantilever according to the invention which is an article constituting the scanning probe microscope shown in FIG. 1.
Figure 3:
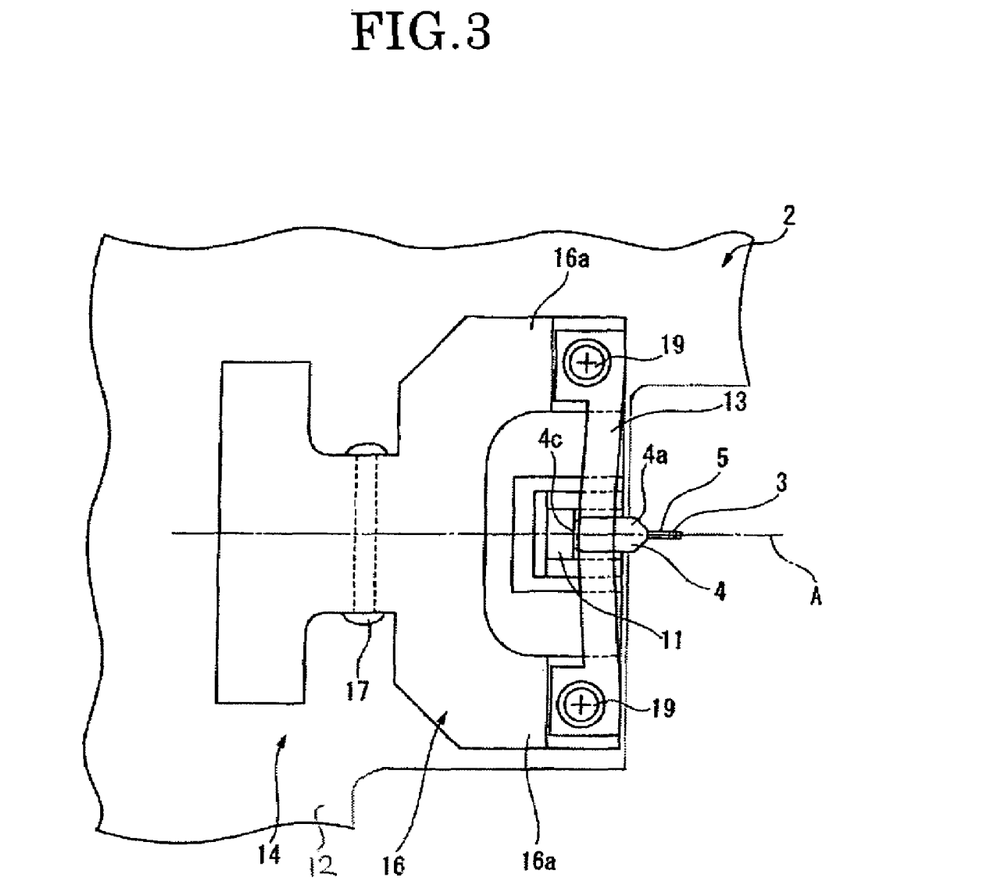
FIG. 3 is a view enlarging a surrounding of a mounting base of the cantilever holder shown in FIG. 2.
Figure 4:
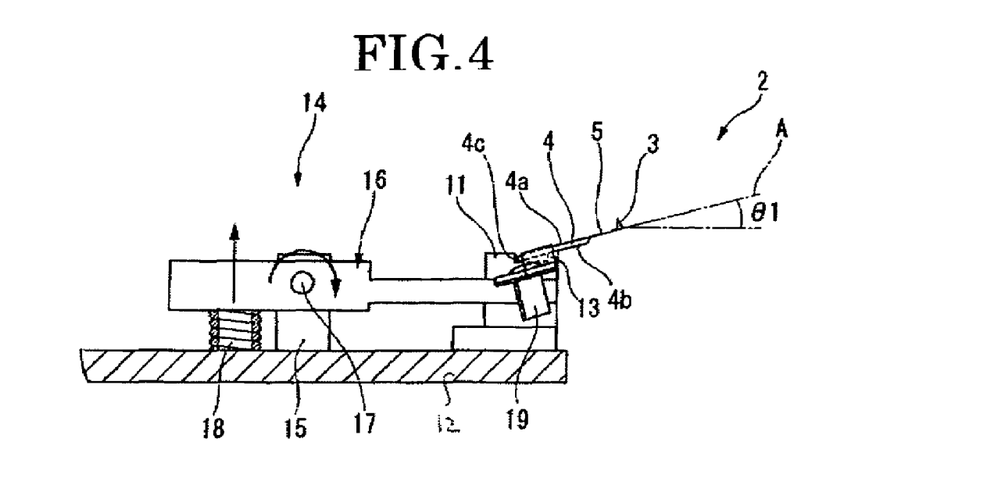
FIG. 4 is a sectional view of the cantilever holder shown in FIG. 3.

As shown by FIG. 2 through FIG. 4, the cantilever holder 2 includes a base member 12 having a mounting portion 11 for mounting the main body portion 4 in a state of being positioned at a predetermined position such that an angle θ1 made by an axis line A of the cantilever 5 and a horizontal face becomes a predetermined angle, a sheet (holding member) 13 in a strip-like shape made to be able to be brought into contact at least with a surface 4a of the main body portion 4 in a state of mounting the main body portion 4 on the mounting portion 11 and extended in a direction substantially orthogonal to the axis line A direction (a longitudinal direction of the cantilever 5), and pressing means 14 for pressing both ends of the sheet 13 to the base member 12 by a predetermined pressure, fixing the main body portion 4 to the mounting portion 11 by way of the sheet 13 and capable of separating the sheet 13 from the surface 4a of the main body portion 4 by releasing depression.

The base member 12 is formed substantially in a U-like shape in a top view thereof and is fixed to an attaching wall W shown in FIG. 1. Further, as shown by FIG. 2, the mounting portion 11 is provided at a vicinity of an opening portion thereof. The mounting portion 11 is brought into contact with a rear face (a face on a side opposed to a side provided with the stylus 3) 4b and a rear end portion 4c of the main body portion 4. Thereby, as shown by FIG. 4, the cantilever 5 is made to be able to be mounted on the mounting portion 11 without a positional shift therebetween in a state of being inclined relative to the horizontal face by the predetermined angle θ1.

Further, the base member 12 is provided with a stay portion 15 at a position remote from the mounting portion 11 by a predetermined distance, and an upper portion of the stay portion 15 is pivotably attached with a holding plate 16 made of a metal coupled by a pin. That is, the holding plate 16 is made to be rotated centering on a pin 17.

As shown by FIG. 3, the holding plate 16 is formed in a U-like shape in a top view thereof at a front end side thereof and a base end side thereof is formed by a rectangular shape in the top view. Further, the holding plate 16 is arranged such that the mounting portion 11 is disposed at inside of an opening portion on the front end side. That is, two of projected portions 16a are arranged on both sides to interpose the mounting portion 11 therebetween.

Further, as shown by FIG. 4, a spring 18 for urging the base member 12 to separate the base end side from the base member 12 is provided between the base end side of the holding plate 16 and the base member 12. Thereby, the holding plate 16 is always rotated centering on the pin 17 to urge the front end side to the base member 12.

The sheet 13 is formed by a resin species material of, for example, polyimide, polyamide or the like and both ends thereof are fixed to the two projected portions 16a by screw members 19. That is, the sheet 13 is bridged between the two projected portions 16a in a state of being brought into contact with the surface 4a (a face on the side provided with the stylus 3) of the main body portion 4.

Here, as described above, the front end side of the holding plate 16 is always urged to the base member 12 and therefore, also the sheet 13 fixed to the two projected portions 16a is similarly urged to the base member 12. That is, at least the surface 4a of the main body portion 4 is made to be able to be pressed to the mounting portion 11 by way of the sheet 13.

That is, the holding plate 16, the stay portion 15 and the spring 18 constitute the pressing means 14.

Further, according to the embodiment, as shown by FIG. 1, a piezoelectric element 20 for oscillating the cantilever 5 at a predetermined frequency by way of the main body portion 4 is provided between the mounting portion 11 and the main body portion 4. The piezoelectric element 20 is oscillated in accordance with a voltage applied from an oscillating power source 21.

Further, the stage 6 is mounted above the XY scanner 7 and the XY scanner 7 is mounted above the Z scanner 8. Further, the Z scanner 8 is mounted above an oscillation isolating base, not illustrated. The XY scanner 7 and the Z scanner 8 comprise, for example, piezoelectric elements and made to move finely in respective directions by being applied with voltages respectively from an XY control portion 22 and a Z control portion 23.

Further, a light irradiating portion 24 for irradiating laser light L to a reflecting face, not illustrated, of the cantilever 5 and a light detecting portion 25 for receiving the laser light L reflected by the reflecting face are arranged above the sample S. The light detecting portion 25 is constituted by, for example, a photodetector divided by 4 for detecting a displacement, that is, an oscillating state of the cantilever 5 from an incident position of the laser light L. Further, the light detecting portion 25 outputs the detected displacement of the oscillating state of the cantilever 5 as a DIF signal.

Further, a control portion 26 controls the Z control portion 23 by a feed back control based on the outputted DIF signal to control a distance between the stylus 3 and the sample S to be always constant. Further, at the same time, a surface shape of the sample S is made to be able to be measured based on the DIF signal. That is, the light irradiating portion 24 and the light detecting portion 25 constitute the measuring means 10.

Further, the control portion 26 is provided with a function comprehensively controlling the above-described respective constituent articles.

An explanation will be given as follows of a case of measuring the surface shape of the sample S by the cantilever holder 2 and the scanning probe microscope 1 constituted in this way.

First, the sample S is mounted on the stage 6, the cantilever 5 in accordance with the sample S is selected and the cantilever 5 is mounted to the cantilever holder 2. After fixing the cantilever 5, positions of the light irradiating portion 24 and the light detecting portion 25 or the like are adjusted such that the laser light L is irradiated to the reflecting face of the cantilever 5, and reflected laser light L is firmly incident on the light detecting portion 25. Successively, the cantilever 5 is oscillated by applying the predetermined voltage to the piezoelectric element 20 from the oscillating power source 21, the Q curve is measured and the operating point (optimum value of the oscillating frequency) is set.

After finishing the initial setting, the surface shape of the sample S is measured. That is, the sample S is scanned by moving the XY scanner 7 by the XY control portion 22 in a state of setting a distance between the stylus 3 and the sample S to a constant distance. At this occasion, the cantilever 5 is flexed in accordance with recesses and projections of the surface of the sample and therefore, an incident position of the laser light L (laser light reflected by the reflecting face) incident on the light detecting portion 25 differs. Further, the light detecting portion 25 outputs the DIF signal in accordance with the incident position to the control portion 26. The control portion 26 measures the surface shape of the sample S based on the DIF signal and controls by a feed back control such that the distance between the stylus 3 and the sample S becomes always constant by moving the Z scanner 8 by the Z control portion 23. Thereby, a surface shape of the sample S can be measured.

Here, a further detailed explanation will be given as follows of the method of fixing the cantilever 5.

First, the base end side of the holding plate 16 is pressed to the base member 12 by a force against a force of the spring 18. Thereby, the holding plate 16 is rotated centering on the pin 17 to move such that the front end side is separated from the base member 12. Under the state, the main body portion 4 of the cantilever 5 is mounted on the mounting portion 11. At this occasion, the rear face 4b and the rear end portion 4c of the main body portion 4 are brought into contact with the mounting portion 11 and therefore, the main body portion 4 is brought into a state of being firmly positioned without positional shift. Further, in the mounting state, the angle θ1 made by the axis line A of the cantilever 5 and the horizontal face is brought into a state of being maintained at a predetermined angle.

After finishing to mount the main body portion 4, when a pressing force (press force) on the base end side of the holding plate 16 is gradually released. When the pressing force is released, the base end side of the holding plate 16 is always urged by the spring 18 and therefore, the front end side of the holding plate 16 starts moving gradually to the base member 12, and the sheet 13 starts to be brought into contact with the surface 4a of the main body portion 4. Further, by moving further the holding plate 16, the main body portion 4 can be pressed to the mounting portion 11 to be fixed by pressing the both ends of the sheet 13 to the base member 12.

Particularly, the sheet 13 comprises the resin species material and therefore, the sheet 13 is easy to be deformed by an elasticity of it own. Therefore, the sheet 13 is deformed in accordance with small recesses and projections of the surface 4a of the main body portion 4 and the outer shape of the main body portion 4 and brought into close contact therewith in a state of being brought into close contact therewith. That is, different from the point contact of the related art, there is brought about a state in which there is not a clearance between the sheet 13 and the main body portion 4 and a contact area is increased. Therefore, the main body portion 4 can firmly be pressed to the mounting portion 11 to be fixed.

Therefore, when the cantilever 5 is oscillated, the main body portion 4 can be restrained from being oscillated by transmitting oscillation of the cantilever 5 and therefore, an influence is not effected on the state of oscillating the cantilever 5 and the cantilever 5 can firmly be oscillated at the predetermined frequency. As a result, the Q curve can accurately and stably be measured, reliability of a result of measurement can be promoted and handling thereof can be facilitated. Further, since the sheet 13 is utilized, the contact with the main body portion 4 becomes the face contact and the fixing becomes further ensured. Also an attenuating (damping) effect by the elasticity of its own is operated and therefore, an influence is not effected on the state of oscillating the cantilever 5.

Further, by pressing the base end side of the holding plate 16 again, the front end side of the holding plate 16 can be separated from the base member 12 and therefore, the cantilever 5 can be interchanged.

Further, by adopting polyimide or polyamide as a resin species material, elongation can be made to be as small as possible and therefore, even used for a long period of time, the cantilever 5 can firmly be fixed by way of the main body portion 4 in a state the same as that in starting to be used. Therefore, the reliability can be promoted.

Figure 5:
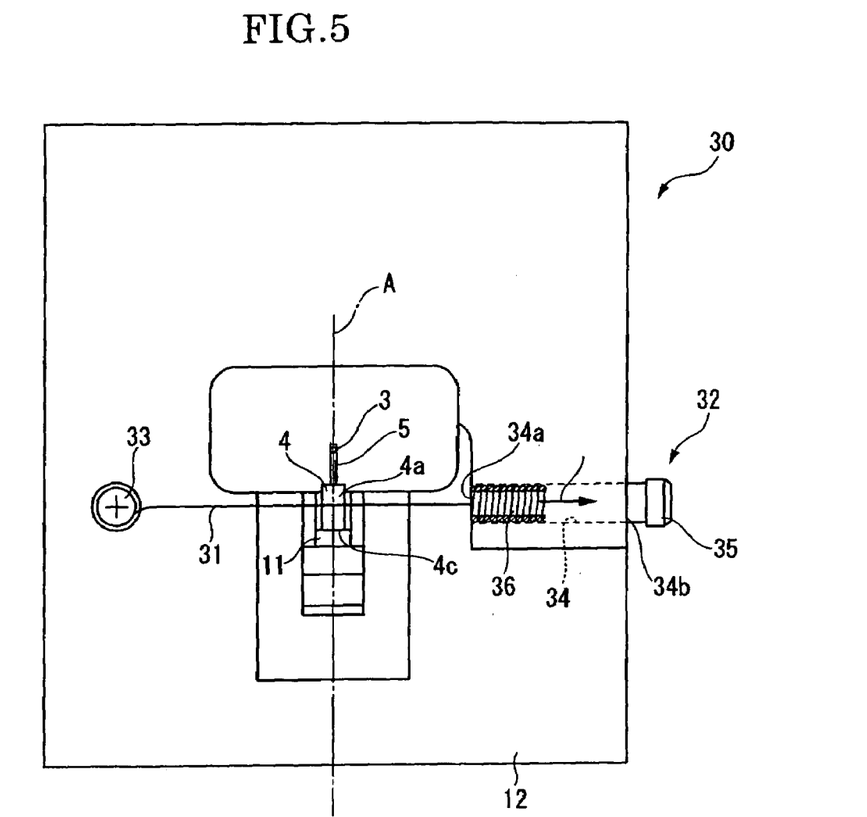
FIG. 5 is a top view showing a second embodiment of a cantilever holder according to the invention.
Figure 6:
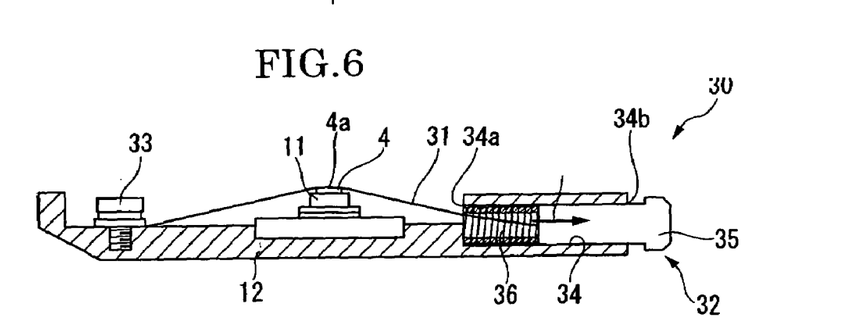
FIG. 6 is a sectional view of the cantilever holder shown in FIG. 5.
Figure 7:
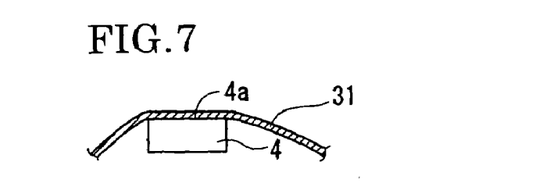
FIG. 7 is an enlarged sectional view showing a state of fixing a main body portion by a wire of the cantilever holder shown in FIG. 6.

Next, a second embodiment of a cantilever holder according to the invention will be explained in reference to FIG. 5 through FIG. 7. Further, according to the embodiment, portions the same as constituent elements in the first embodiment are attached with the same notations and an explanation thereof will be omitted.

A point of the second embodiment which differs from the first embodiment resides in that although according to the first embodiment, the main body portion 4 is fixed by utilizing the sheet 13, according to the cantilever holder of the second embodiment, the main body portion 4 is fixed by utilizing a wire formed by a resin species material.

That is, a cantilever holder 30 of the embodiment includes a wire (holding member) 31 made to be able to be brought into contact with at least the surface 4a of the main body portion 4 in a state of mounting the main body portion 4 on the mounting portion 11 and extended in a direction substantially orthogonal to the axis line A direction, and pressing means 32 for pressing both ends of the wire 31 to the base member 12 by a predetermined pressure, fixing the main body portion 4 to the mounting portion 11 by way of the wire 31 and capable of separating the wire 31 from the surface 4a of the main body portion 4 by releasing depression.

Further, according to the embodiment, the base member 12 is formed by a rectangular shape in a top view thereof.

The base member 12 is provided with a screw member 33 for fixing one end of the wire 31 in a direction orthogonal to the axis line A direction of the cantilever 5. One end side of the wire 31 is fixed by being wound at a surrounding of the screw member 33. Further, the base member 12 is formed with a through hole 34 having openings 34a, 34b respectively at an upper face and a side face thereof at the opposite side of the screw member 33 along an axis line of the wire 31 sandwiching the mounting portion 11.

Further, a plug 35 is inserted from the opening 34b of the side face to an inner portion of the through hole 34 movably in the through hole 34. Further, a spring 36 is arranged at inside of the through hole 34 for urging a base end side of the plug 35 to an outer side.

Further, other end side of the wire 31 enters the through hole 34 by way of the opening 34a of the upper face to be connected to the base end side of the plug 35. Thereby, the wire 31 is brought into a state of being pulled always to press the main body portion 4 mounted on the mounting portion 11 to the base member 12.

That is, the screw member 33, the through hole 34, the plug 35 and the spring 36 constitute the pressing means 32.

An explanation will be given as follows of a case of fixing the cantilever 5 by the cantilever holder 30 constituted in this way.

First, the plug 35 is pushed to inside of the through hole 34 by a force against a force of the spring 36 to loosen the wire 31. Under the state, the main body portion 4 of the cantilever 5 is mounted on the mounting portion 11. At this occasion, the rear face 4b and the rear end portion 4c of the main body portion 4 are brought into contact with the mounting portion 11 and therefore, the main body portion 4 is brought into a state of being positioned without a positional shift. Further, an angle made by the axis line A of the cantilever 5 and the horizontal face is brought into a state of being maintained at the predetermined angle θ1.

After finishing to mount the main body portion 4, the plug 35 is gradually loosened from being pressed. Thereby, the other end side of the wire 31 is pulled by the plug 35 and the wire 31 starts to be brought into contact with the surface 4a of the main body portion 4. Further, by further moving the plug 35, the both ends of the wire 31 are pressed to the base member 12 by a predetermined pressure and the main body portion 4 can be pressed to the mounting portion 11 to be fixed by way of the wire 31.

Particularly, since the wire 31 comprises the resin species material, the wire 31 is easy to be deformed by an elasticity of its own. Therefore, as shown by FIG. 7, the wire 31 is deformed in accordance with small recesses and projections of the surface 4a of the main body portion 4 and the outer shape of the main body portion 4 and is brought into line contact therewith in a state of being brought into close contact therewith. That is, different from the point contact of the related art, there is brought about a state in which there is not a clearance between the wire 31 and the main body portion 4 and the contact area is increased. Therefore, the main body portion 4 can firmly be pressed to the mounting portion 11 to be fixed.

Therefore, similar to the above-described first embodiment, the cantilever 5 can be fixed without effecting an influence on the oscillating state and therefore, the Q curve can accurately and stably be measured and reliability of a result of measurement can be promoted.

Further, according to the embodiment, inside of the wire 31 may be provided with a flexible axis core comprising a material made of a metal. Thereby, the wire 31 becomes more solid and the pressing force can further efficiently be transmitted to the main body portion 4. Therefore, the main body portion 4 can stably and firmly be fixed.

Next, a third embodiment of a cantilever holder according to the invention will be explained in reference to FIG. 8 through FIG. 10. Further, according to the embodiment, portions the same as constituent elements in the first embodiment are attached with the same notations and an explanation thereof will be omitted.

A point of the third embodiment which differs from the first embodiment resides in that although according to the first embodiment, the main body portion 4 is fixed by utilizing the sheet 13, according to the cantilever holder 40 of the third embodiment, the main body portion 4 is fixed by a holding plate (plate-like member) 41 per se.

Figure 8:
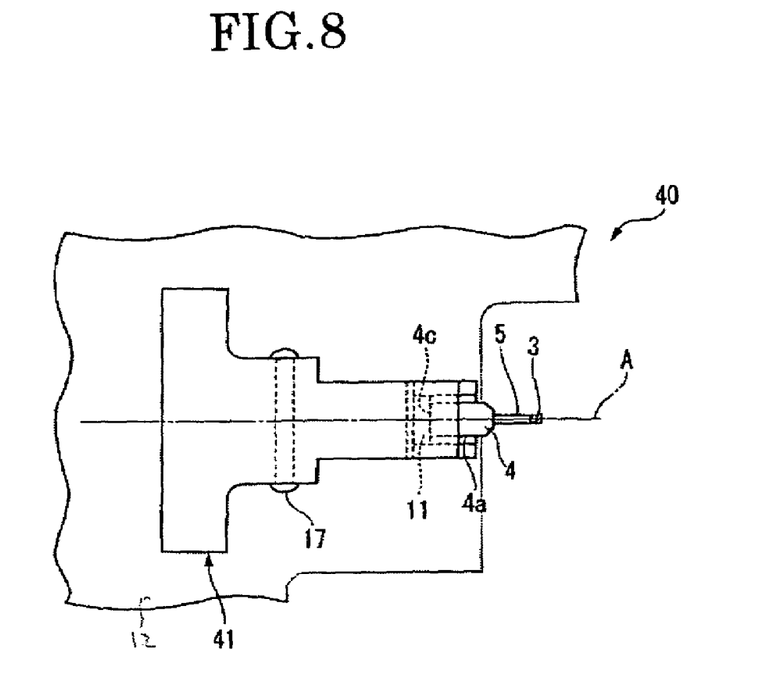
FIG. 8 is a top view showing a third embodiment of a cantilever holder according to the invention.
Figure 9:
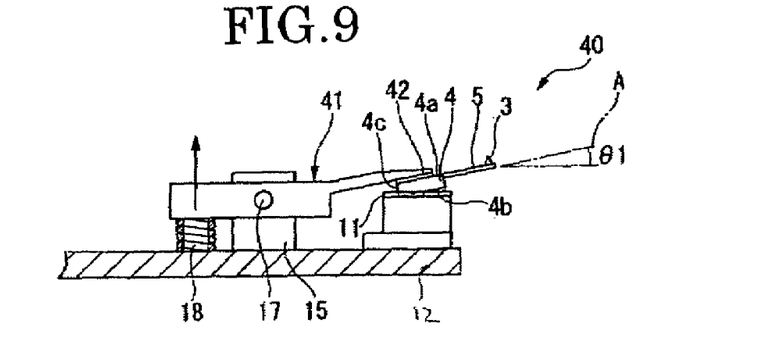
FIG. 9 is a sectional view of the cantilever holder shown in FIG. 8.
Figure 10:
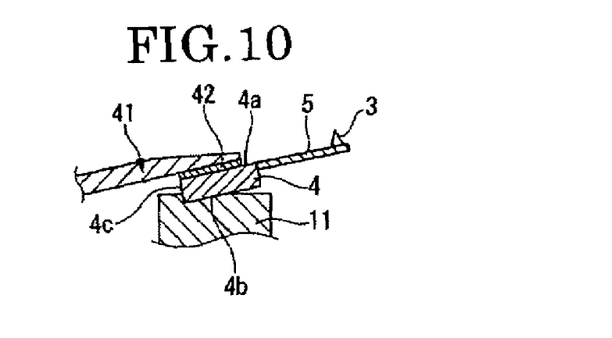
FIG. 10 is an enlarged sectional view showing a state of fixing a main body portion by a holding plate of the cantilever holder shown in FIG. 9.

That is, as shown by FIG. 8 and FIG. 10, the cantilever holder 40 according to the embodiment includes the holding plate 41 brought into contact with at least the surface 4a of the main body portion 4 in a state of mounting the main body portion 4 on the mounting portion 11.

The holding plate 41 is formed by a rectangular shape in a top view thereof and is coupled to the stay portion 15 by a pin. Further, a front end side of the holding plate 41 is brought into contact with the surface 4a of the main body portion 4 and a base end side thereof is urged by the spring 18. Further, as shown by FIG. 10, the holding plate 41 is formed with a resin species film 42 at a region thereof (front end side) brought into contact with the surface 4a of the main body portion 4.

An explanation will be given of a case of fixing the cantilever 5 to the cantilever holder 40 constituted in this way as follows.

First, the base end side of the holding plate 41 is pressed to the base member 12 by a force against the force of the spring 18. Thereby, the holding plate 41 is rotated centering on the pin 17 and the front end side is moved to separate from the base member 12. Under the state, the main body portion 4 of the cantilever 5 is mounted on the mounting portion 11.

After finishing to mount the main body portion 4, a press force on the base end side of the holding plate 41 is gradually released. Thereby, a front end side of the of the holding plate 41 is moved gradually to the base member 12 and the resin species film 42 starts to be brought into contact with the surface 4a of the main body portion 4. Further, by further moving the holding plate 41, the front end side of the holding plate 41 can press the main body portion 4 to the mounting portion 11 to be fixed by a predetermined force by way of the resin species film 42.

Particularly, a region of bringing the holding plate 41 and the main body portion 4 into contact with each other is provided with the resin species film 42 and therefore, when pressed, the resin species film 42 is deformed in accordance with small recesses and projections of the surface 4a of the main body portion 4 and the outer shape of the main body portion 4 to be brought into contact therewith in a state of being brought into close contact therewith. That is, different from the point contact of the related art, there is brought about a state in which there is not a clearance between the resin species film 42 and the main body portion 4 and the contact area is increased. Therefore, the main body portion 4 can firmly be pressed to the mounting portion 11 to be fixed.

Therefore, similar to the first embodiment, the cantilever 5 can be fixed without effecting an influence on an oscillating state and therefore, the Q curve can accurately and stably be measured and reliability of a result of measurement can be promoted.

Further, although according to the third embodiment, the main body portion 4 is pressed to the mounting portion 11 to be fixed by urging the base end side of the holding plate 41 by the spring 18, the invention is not limited to the constitution. For example, there may be constituted a cantilever holder utilizing a leaf spring without using a spring or the like.

That is, there may be constituted a cantilever by the base member 12 having the mounting portion 11 for mounting the main body portion 4 in a state of being positioned at a predetermined position and a leaf spring for fixing the main body portion 4 to the mounting portion 11 by pressing at least the surface 4a of the main body portion 4 by a predetermined pressure in a state of mounting the main body portion 4 on the mounting portion 11. Further, in this case, similar to the third embodiment, a region of the leaf spring brought into contact with the surface 4a of the main body portion 4 may be provided with the resin species film 42.

By constituting in this way, the main body portion can be fixed to the mounting portion to be fixed by an elasticity of the leaf spring per se and therefore, the constitution can further be simplified and fabrication thereof is facilitated. Further, even when the leaf spring is utilized, similar to the third embodiment, there is provided the resin species film 42 and therefore, the cantilever 5 can firmly be fixed without effecting an influence on an oscillating state.

Further, the technical range of the invention is not limited to the above-described embodiments but can variously be changed within the range not deviated from the gist of the invention.

For example, although according to the above-described respective embodiments, there is taken an example of the case of measuring the surface of the sample by oscillating the cantilever by the predetermined frequency, the invention is not limited thereto but, for example, similar operation and effect can be achieved also in MFM (Magnetic Force Microscope) for measuring a magnetization distribution, a magnetic domain structure or the like of a magnetic sample by oscillating a cantilever having a stylus capable of detecting magnetism similar to the AC mode AFM and detecting an amplitude or a phase of flexing a cantilever at this occasion.

Further, similar operation and effect can be achieved not only in MFM, mentioned above, but, for example, KFM (Kelvin Prove Force Microscope) or SMM (Scanning Maxwell-stress Microscope) for measuring a surface potential distribution or the like of a sample by applying an AC bias voltage between a conductive stylus (cantilever) and a sample, oscillating a cantilever by electrostatic coupling of the stylus and the sample and detecting an amplitude of flexing the cantilever at this occasion.

Further, similar operation and effect can be achieved also in LM-FFM (Lateral Force Modulation Friction Force Microscope) for measuring a friction force distribution by laterally oscillating a sample in a horizontal direction in parallel with a surface of the sample in operating AFM and detecting a torsional oscillation amplitude of a cantilever at this occasion, or V-AFM (Viscoelastic AFM: viscoelasticity measuring-atomic force microscope) or the like for measuring a viscoelasticity distribution by applying a periodic force by finely oscillating a sample in Z direction orthogonal to a surface of the sample in operating AFM and detecting an amplitude of flexing a cantilever, sin component and cos component at this occasion.

Further, although according to the above-described respective embodiments, there is constructed the constitution of oscillating the cantilever, the cantilever may not be oscillated. Also in this case, the cantilever holder is firmly fixed such that the main body portion is not oscillated and therefore, even when oscillation transmitted from a floor, oscillation owing to sound coming from outside or the like is transmitted, the main body portion can be restrained from being oscillated, further, a damping effect (attenuating effect) by the cantilever holder is worked and therefore, the oscillations are not transmitted to the cantilever. Therefore, also in this case, reliability of a result of measurement can be promoted.

Further, although according to the above-described respective embodiments, the measuring means detects the displacement of the cantilever by an optical lever type, the measuring means is not limited to the optical lever type. For example, there may be adopted a self detecting type provided with a displacement detecting function (by, for example, a piezoelectric element or the like) at the cantilever per se.

Further, in the above-described respective embodiments, the holding member and the resin species film may be formed by utilizing, for example, a conductive resin material to provide a conductivity.

Thereby, the cantilever can be prevented from being charged, or charged static electricity can be removed. Further, thereby, an influence effected from an electric field or a magnetic field can be reduced as less as possible. Therefore, reliability of a result of measurement can further be promoted.

Further, as the conductive resin material, a resin species material per se having a conductivity may be utilized, or a material provided by mixing a carbon material of, for example, carbon nanotube or the like or a metal material with a resin species material which is not provided with a conductivity may be utilized.

Further, also according to the above-described respective embodiments, a measuring environment is not referred to, application of the invention is not limited by the measuring environment. The invention is applicable so far as a measuring environment thereof is a measuring environment in which a scanning probe microscope is applicable not only in an atmosphere, but also in a gas, in vacuum, in a liquid or the like. The invention is similarly applicable also in a temperature controlled environment at a low temperature, a high temperature or the like, a humidity controlled environment or the like. Further, in any of the cases, similar operation and effect can be achieved.

What is claimed is:

1. A cantilever holder which is a cantilever holder for attachably and detachably fixing a cantilever which includes a stylus at a front end thereof and a base end side of which is supported by a main body portion in a flat plate shape in a single-supported state, the cantilever holder comprises:
   a base member having a mounting portion for mounting the main body portion in a state of being positioned at a predetermined position;
   a holding member made to be able to be brought into contact with at least a surface of the main body portion in a state of mounting the main body portion on the mounting portion and extended in a direction substantially orthogonal to a longitudinal direction of the cantilever; and
   pressing means for pressing both ends of the holding member to the base member by a predetermined pressure, fixing the main body portion to the mounting portion by way of the holding member and capable of separating the holding member from the surface of the main body portion by releasing the both ends of the holding member from being pressed;
   wherein the holing member is formed by a resin species material.

2. The cantilever holder according to claim 1, wherein the holding member is a sheet in a strip-like shape.

3. The cantilever holder according to claim 1, wherein the holding member is a wire.

4. The cantilever holder according to claim 3, wherein the wire includes a flexible axis core comprising a metallic material at inside thereof.

5. The cantilever holder according to claim 1, wherein the resin species material is a conductive resin material.

6. A scanning probe microscope comprising:
   the cantilever holder according to claim 1;
   the cantilever which includes the stylus at the front end, the base end side of which is supported by the main body portion in the flat plate shape in the single-supported state and which is attachably and detachably fixed to the cantilever holder by way of the main body portion;
   a stage mounted with a sample and capable of arranging the sample opposedly to the stylus;
   moving means for moving the stylus and the sample relative to each other in a direction in parallel with a surface of the sample; and
   measuring means for measuring a displacement of the cantilever.

7. A cantilever holder which is a cantilever holder for attachably and detachably fixing a cantilever which includes a stylus at a front end thereof and a base end side of which is supported by a main body portion in a flat plate shape in a single-supported state, the cantilever holder comprising:
   a base member having a mounting portion for mounting the main body portion in a state of being positioned at a predetermined position;
   a plate-like member made to be able to be brought into contact with at least a surface of the main body portion in a state of mounting the main body portion on the mounting portion; and
   pressing means for fixing the main body portion to the mounting portion by pressing the plate-like member to the surface of the main body portion by a predetermined pressure and capable of separating the plate-like member from the surface of the main body portion by releasing the plate-like member from being depressed;
   wherein the plate-like member is formed with a resin species film at a region thereof brought into contact with the surface of the main body portion.

8. The cantilever holder according to claim 7, wherein the resin species material is formed by a conductive resin material.

9. A cantilever holder which is a cantilever holder for attachably and detachably fixing a cantilever which includes a stylus at a front end thereof and a base end side of which is supported by a main body portion in a flat plate shape in a single-supported state, the cantilever holder comprising:
   a base member having a mounting portion for mounting the main body portion in a state of being positioned at a predetermined position; and
   a leaf spring capable of fixing the main body portion to the mounting portion by pressing at least a surface of the main body portion by a predetermined pressure in a state of mounting the main body portion on the mounting portion;
   wherein the leaf spring is formed with a resin species film at a region thereof brought into contact with the surface of the main body portion.

10. The cantilever holder according to claim 9, wherein the resin species material is formed by a conductive resin material.

* * * * *